(12) United States Patent
Akiyoshi et al.

(10) Patent No.: US 7,173,626 B2
(45) Date of Patent: Feb. 6, 2007

(54) ANIMATION DISTRIBUTING METHOD, SERVER AND SYSTEM

(75) Inventors: Kozo Akiyoshi, Tokyo (JP); Nobuo Akiyoshi, Tokyo (JP)

(73) Assignee: Monolith Co., Ltd, Tokyo (JP)

( * ) Notice: Subject to any disclaimer, the term of this patent is extended or adjusted under 35 U.S.C. 154(b) by 833 days.

(21) Appl. No.: 09/960,984

(22) Filed: Sep. 25, 2001

(65) Prior Publication Data

US 2002/0036640 A1    Mar. 28, 2002

(30) Foreign Application Priority Data

Sep. 25, 2000    (JP) .............................. 2000-290540

(51) Int. Cl.
*G06T 13/00*    (2006.01)
(52) U.S. Cl. ...................... 345/475; 345/473; 345/474; 345/591; 709/231
(58) Field of Classification Search ................ 345/473, 345/475, 427, 441, 474, 951; 709/231; 382/100
See application file for complete search history.

(56) References Cited

U.S. PATENT DOCUMENTS

| 6,018,592 | A | 1/2000 | Shinagawa et al. |
| 6,081,278 | A * | 6/2000 | Chen .......................... 345/473 |
| 6,137,910 | A | 10/2000 | Shinagawa et al. |
| 6,614,914 | B1 * | 9/2003 | Rhoads et al. .............. 382/100 |
| 2005/0058319 | A1 * | 3/2005 | Rhoads et al. .............. 382/100 |

* cited by examiner

*Primary Examiner*—Kimbinh T. Nguyen (57) ABSTRACT

An animation distributing server receives a request from a user to distribute animation. The server selects key frames to be transmitted and transmits the selected key frames to the user. Thereafter, compact interpolation data, for interpolating between the key frames, are generated, a digital watermarking processing is performed thereon, and the interpolation data are transmitted to the user. A viewer, for composing an animation from the key frames and interpolation data, may be sent to the user. The key frames and the interpolation data are transmitted separately in a manner such that they can be integrated at the user side.

17 Claims, 10 Drawing Sheets

| USER ID | NAME | CHARGE AMOUNT |
|---|---|---|
| 0001 | ○○ TARO | 1,000 |
| 0002 | ××HANAKO | 2,500 |
| | | |

USER DATABASE : T3

ANIMATION DISTRIBUTING METHOD, SERVER AND SYSTEM

BACKGROUND OF THE INVENTION

1. Field of the Invention

The present invention relates to an animation distributing technology. More particularly, it relates to a method, server and system for distributing animation via a network.

2. Description of the Related Art

The Internet has created environments in which diverse information that never existed in the past can now be provided through various Internet services. For instance, on-demand distributor broadcasting, an idea that has existed for a long time, has become a reality due to the advancement of computer technology and network infrastructure.

Motion pictures, including live action, animation or the like, (hereinafter referred to as animation) are normally composed by displaying or switching between a plurality of frame pictures at a predetermined rate. When animation is distributed (broadcast) on television or the like, many frame pictures are transmitted at a standard rate depending on various factors, including the type of distribution. On the Internet, it is generally preferable to reduce the amount of data transmitted, even though the speed of communication via the Internet has become fairly high. Even in cases where data are first downloaded to a local storage medium (such as a disk in a PC) and the animation is then reproduced on the PC, there still are significant economical and practical constraints on the distribution if the amount of data is excessively large.

Moreover, in distribution via the Internet there is a risk that the animation might be misappropriated by third parties who are not the intended receivers of the animation.

SUMMARY OF THE INVENTION

The present invention has been made in view of the foregoing circumstances. One of the objects of the present invention is to provide an animation distribution method, server, and system which uses only a small amount of data. Another object of the present invention is to provide an animation distribution method, server and system which includes security features.

According to a preferred embodiment of the present invention there is provided an animation distributing server that includes: a key frame acquiring unit which acquires key frames from among a plurality of frames that constitute an animation; an interpolation data generator which generates interpolation data used for composing an animation by interpolating between the key frames; and an interpolation data distributing unit which distributes the interpolation data to a user in a manner such that the interpolation data are separated from the key frames.

Typically the key frames alone or the interpolation data alone can not be used to reproduce an animation. Transmitting the key frames and the interpolation data separately can prevent the animation from being misappropriated. Moreover, the animation is composed of the key frames and a small amount of interpolation data so that the total amount of data required for distribution and reproduction the animation is reduced.

The interpolation data generator may generate the interpolation data by performing a matching processing between the key frames.

The server may include a key frame distributing unit which distributes the key frames to the user in a manner such that the key frames are capable of being integrated with the separately transmitted interpolation data at the user's end. The key frames and the interpolation data may be capable of being integrated by implementing, for example, a method in which the names of the separately sent files include the same identification number.

The server may further include a key frame selector which selects key frames to be sent to the user, either from the key frames or from the plurality of frames, and the interpolation data generator may generate the interpolation data which interpolates the selected key frames. The key frame selector may select the key frames in such a manner that the combination of key frames selected differs for each user. Recording the combination of the key frames distributed to the users makes it possible to identify the user who duplicated or has re-distributed the animation in the event that an unauthorized copy of the animation appears in public.

The key frame selector may also select the key frames based on a condition related to image quality of the animation. For example, for users who desire high image quality, more key frames are selected by narrowing the interval between the key frames; whereas, for users to whom low image-quality animation suffices, a reduced number of key frames are selected by increasing the interval between the key frames. Moreover, a charge related to the animation may vary according to the image quality selected.

The server may further include a viewer distributing unit which distributes a viewer that reproduces the animation using the distributed key frames and interpolation data. The server may further include a digital watermarking processing unit which inserts digital watermarking data into the interpolation data or viewer. Thus, if unauthorized duplicates of the animation are circulated widely, their source can be tracked down, and further unauthorized distribution can be prevented.

According to another preferred embodiment of the present invention there is provided an animation distributing system that includes: a key frame distributing server serving as a first server which distributes, to a user, key frames from among frames that constitute an animation; and an interpolation data distributing server serving as a second server which generates interpolation data to construct an animation by interpolating the key frames and then distributes the interpolation data to the user. The second server may be situated at a different site from that of the first server. For example, the first server may be located at the office of a film distributing or copyright management agency while the second server may be located at the site of a company entrusted with film distribution via a network.

The key frame distributing server may include: a distributing request receiving unit which receives from the user a distribution request; a key frame sending unit which, upon receipt of the distribution request, transmits the key frames for a desired animation to the user; and an interpolation data requesting unit which requests the interpolation data distributing server to distribute the interpolation data. The interpolation data distributing server may include: an interpolation data generator which, upon receipt of the interpolation data distribution request from the interpolation data requesting unit, generates the interpolation data; and an interpolation data distributing unit which distributes the interpolation data to the user in a manner such that the key frames are associated with the interpolation data.

In a particular case, the key frame sending unit may transmit the key frames to the interpolation data distributing server and the interpolation data generator may generate interpolation data for the key frames transmitted from the key frame sending unit.

According to another preferred embodiment of the present invention there is provided an animation distributing method. That includes: acquiring key frames from among a plurality of frames that constitute an animation; acquiring interpolation data used for composing an animation by interpolating the key frames; and distributing to the same user the key frames and the interpolation data via different routes, respectively. In this distributing step, the key frames and the interpolation data may alternatively be distributed to the same user via the same route but at different times. The phrase "acquiring interpolation data" does not necessarily mean that the interpolation data is generated. For example, interpolation data may also be retrieved from storage or the like if previously generated.

Moreover, any arbitrary combination of the above-described structural components, elements, or method elements as applied to or interchanged between an apparatus, a method, a system and so forth, are intended to be effective as and encompassed by the embodiments of the present invention.

Moreover, this summary of the invention may include additional features or exclude common or known features so that the invention may also be a sub-combination or have features other than those described.

DETAILED DESCRIPTION OF THE INVENTION

The invention will now be described based on the preferred embodiments. The preferred embodiments are not intended to limit the scope of the present invention but to exemplify the invention. All of the features, and any combinations thereof, described in the embodiments are not necessarily essential to the scope of the invention which is more particularly described in the claims.

EMBODIMENT 1

Figure 1:
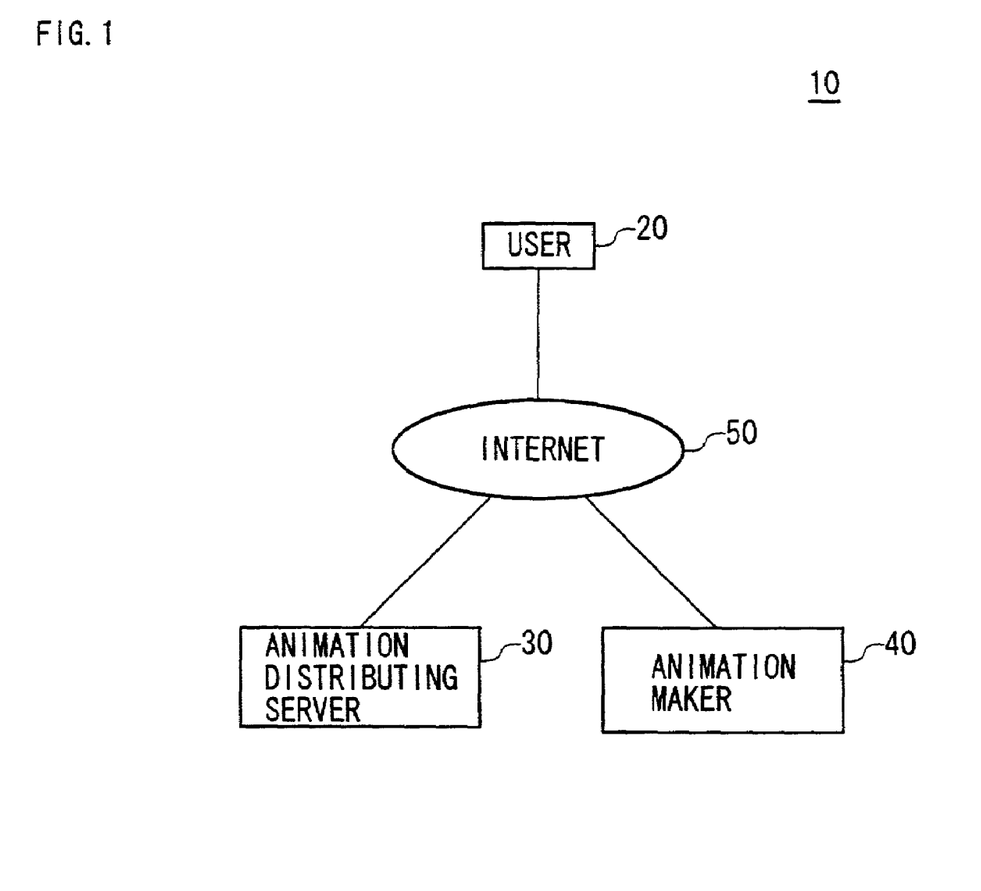
FIG. 1 shows a structure of an animation distributing system according to a first embodiment of the present invention.

FIG. 1 shows a structure of an animation distributing system 10 according to a first embodiment. In the animation distributing system 10, a user terminal 20, a terminal 40 of an animation maker that produces animation, and an animation distributing server 30 which distributes animation by generating interpolation data from the key frames are all connected to a network (for example, the Internet 50 in FIG. 1). Hereinafter, the word "user", when used alone, may mean a user himself/herself or a user terminal. Similarly, "maker" may mean a maker itself or a maker's terminal.

The animation distributing system 10 according to this embodiment separates an animation into key frames, generates interpolation data, and distributes the key frames and interpolation data separately. The key frames are the frames that serve as principal, basic or key ones among a plurality of frames constituting the animation. For example, the frames corresponding to the moment when an action occurs or when a background or the perspective angle changes may be chosen as the key frames. The interpolation data are information used for composing an animation by interpolating between the key frames.

As a method by which to generate the interpolation data from the key frames, it is possible to use a technique described in Japanese Patent No. 2927350 owned by the same assignee of the present invention. A technique in which animation is reproduced from key frames and interpolation data is also disclosed in the Japanese Patent No. 2927350. In summary, the technique described in the said Japanese Patent, uses a positional correspondence relation between pixels of two key frames, that is, matching data between the two key frames, as the interpolation data. Firstly, critical points are extracted from the respective key frames and then the correspondence between the pixels are obtained by evaluating the correspondence of the critical points in terms of both the positional closeness and the closeness of the pixel values. Once the correspondence relation is known, an intermediate frame between the key frames can be generated by interpolating, that is, by interior-dividing the positions and pixel values of pixels that correspond between the two key frames.

Using this technique, animations with high image quality can be distributed using a smaller amount of data when compared to conventional motion picture distributing methods. Thus, even with the current communication speed on the Internet, animations can be distributed with a sufficient image quality, without requiring a long communication time. It is noted that the method to generate the interpolation data from the key frames is not limited to the described technique and any other known matching techniques may be implemented to obtain the interpolation data.

Figure 2:
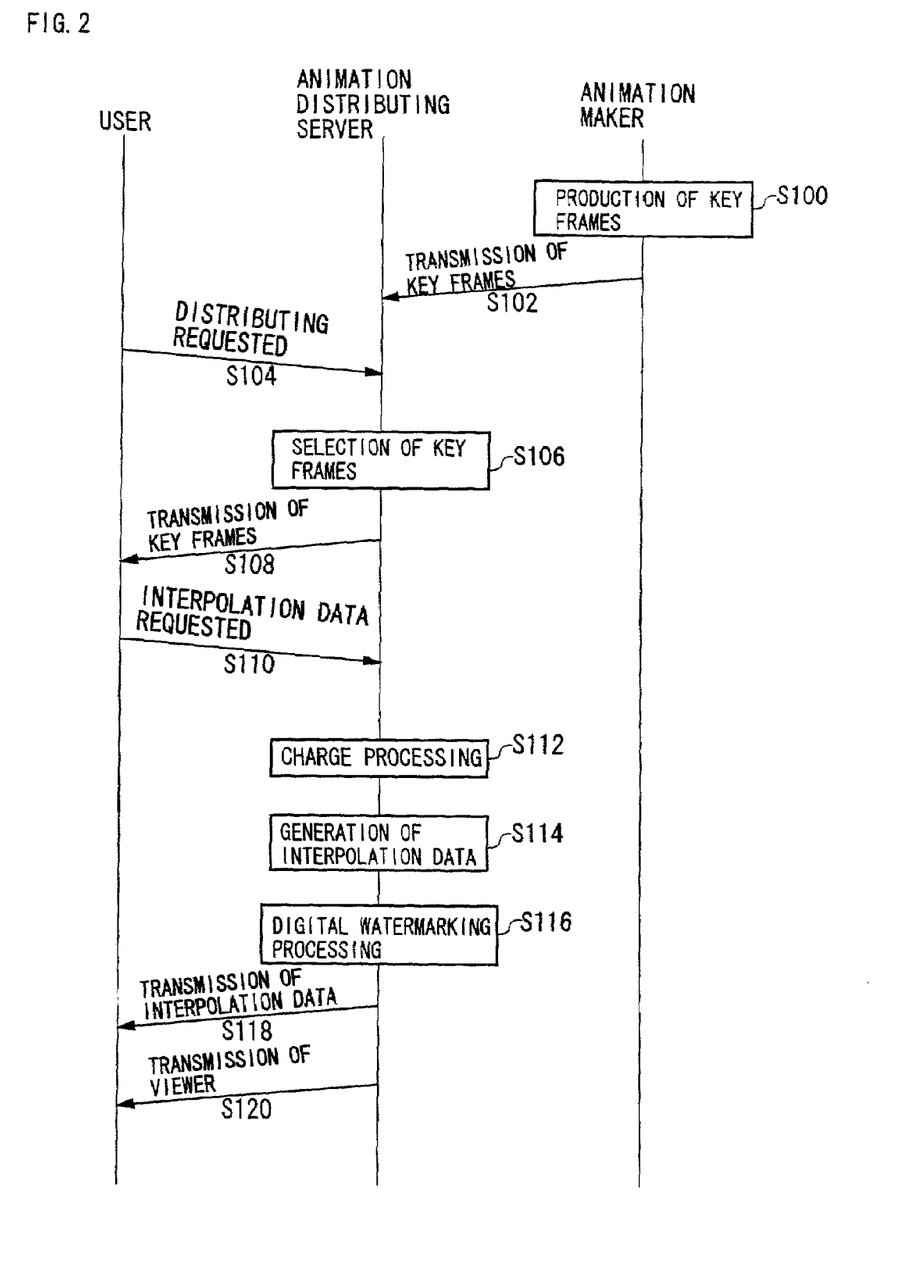
FIG. 2 shows a schematic procedure for a process of animation distribution in the animation distribution system according to the first embodiment.

FIG. 2 describes a process flow in the animation distributing system 10 when animation is distributed from the animation distributing server 30 to the user 20, in terms of communication among the user 20, the animation distributing server 30 and the animation maker 40. An overview thereof is given here while the details will be described later.

As shown in FIG. 2, firstly the animation maker 40 produces key frames (S100) which will be transmitted to the animation distributing server 30 (S102). When the animation distributing server 30 receives a request for animation distribution from the user (S104), the animation distributing server 30 selects the key frames to be distributed, based on a user's instruction (S106) and transmits the selected key frames to the user (S108). Next, when a request for interpolation data is made from the user (S110), the animation distributing server 30 carries out a charge processing (S112), generates the interpolation data (S114), carries out a process of inserting digital watermarks (S116), and transmits the interpolation data to the user (S118). Moreover, the animation distributing server 30 sends the user a viewer by which to reproduce animation from the key frames and the interpolation data (S120). If necessary, the animation distributing server 30 also sends to the user audio data associated with the animation.

Figure 3:
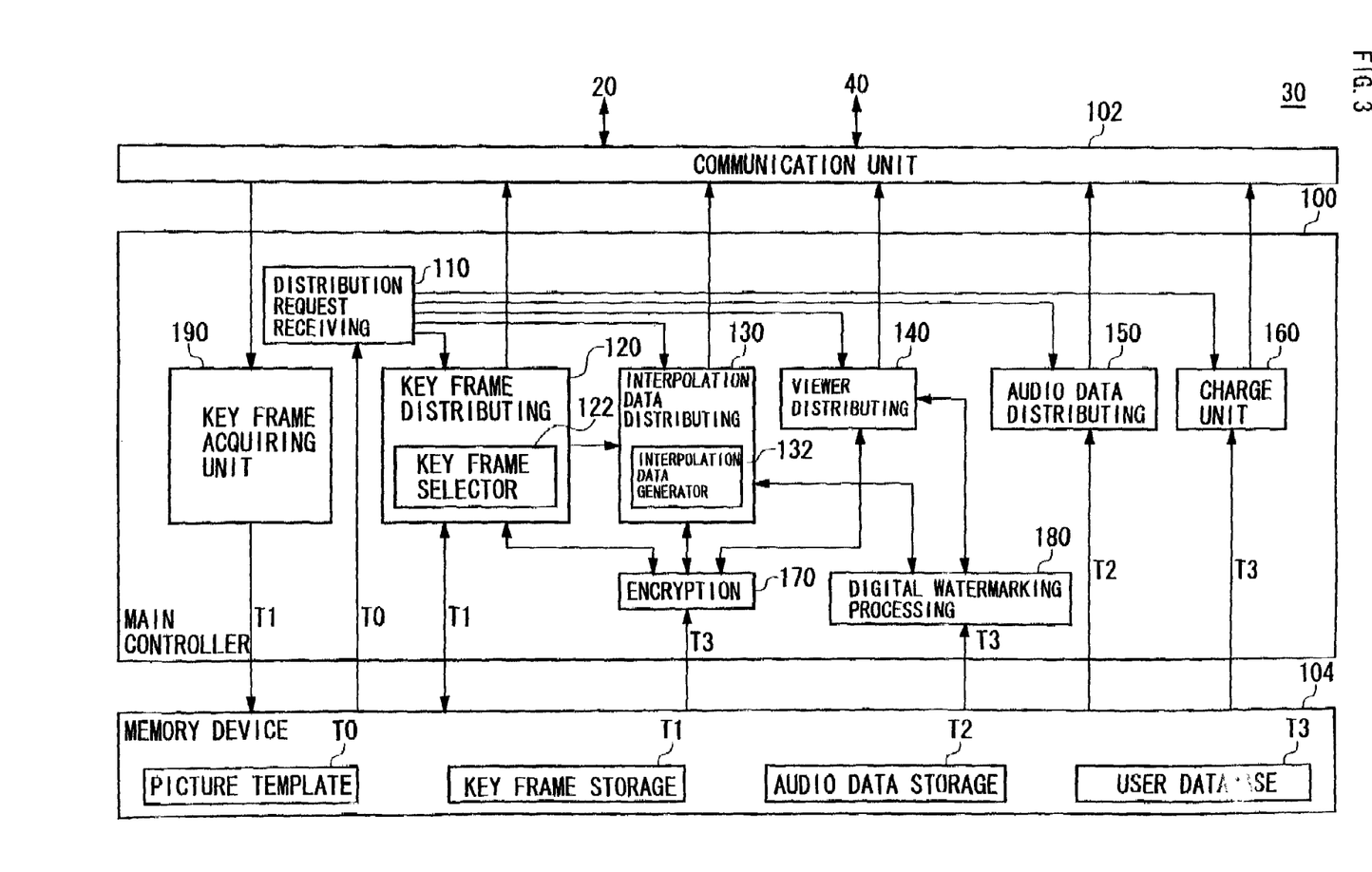
FIG. 3 shows an internal structure of an animation distributing server.

FIG. 3 shows an internal structure of the animation distributing server 30. Although this structure can be realized by hardware components, such as, an arbitrary CPU, memory, and software, such as, a memory-loaded program having animation distributing capacity, and so forth, FIG. 3 illustrates functional blocks. It will be understood by a person skilled in the art that these functional blocks can be realized by hardware only, software only or various forms including any combination thereof.

The animation distributing server 30 includes a main controller 100, a communication unit 102, a memory device 104, and functions also as a Web server. The communication unit 102 exchanges data between the main controller 100, the user terminal 20 and the animation maker's terminal 40. The communication unit 102 may be provided with hardware, such as a modem, necessary for communication and a driver for controlling the communication, and other programs.

In the memory device 104, various data and tables are stored. A picture template T0 stores pictures that the animation distributing server 30, as a Web server, may present to the user terminal 20 as data described by markup languages such as HTML and XML.

A key frame storage T1 stores key frames received from the animation maker 40. For example, key frames may be selected, by the animation maker 40, from the animation frames already made for distribution purposes for movies and TV's, at predetermined intervals, so as to be transmitted to the animation distributing server 30. Moreover, the key frames may be selected so that the motion of a character can be seen further naturally when the key frames are interpolated. Moreover, all frames that constitute the animation may be transmitted to the animation distributing server 30 so that the animation distributing server 30 may select key frames from among all of the frames. Alternatively, key frames may be made on the assumption that the animation is distributed in a method according to the present embodiment.

An audio data storage T2 stores audio data accompanying an animation. The audio data may be the same as audio data that the animation maker 40 has already made for distribution purposes for movies and TV.

Figure 4:
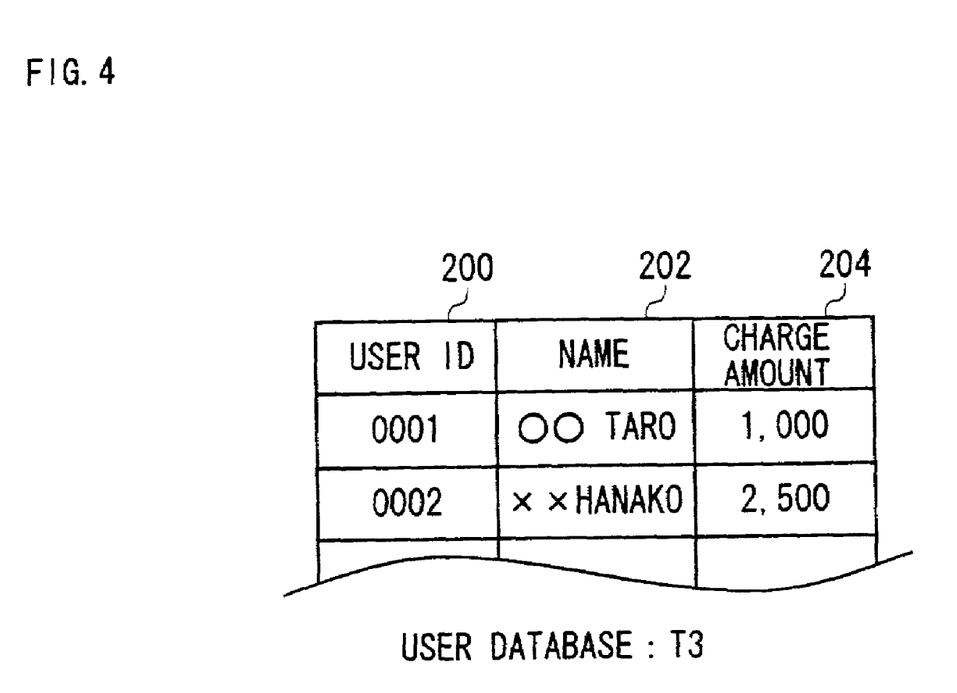
FIG. 4 shows example of a user database.

A user database T3 stores information on users. FIG. 4 shows an example of a structure of the user database T3. In this example, the user database T3 includes a user ID column 200, a name column 202 and a charge amount column 204. As an example, the name "○○TARO" and the charge amount "1000 Yen" are registered as information for the user ID "0001".

Further information may be stored in the user database T3 as well. For example, information on an animation that was distributed to the user may be stored in the user database T3. Then, as will be described later, a combination of key frames distributed to the user may be recorded. If the combination of the key frames are recorded and different key frames are distributed to different users, it is possible to find a user who creates an unauthorized (illegal) duplication of an animation.

A key frame acquiring unit 190 acquires key frames sent from the animation maker 40, and stores the key frames in the key frame storage Ti.

A distribution request receiving unit 110 reads out a screen necessary for receiving a distribution request of animation sent from a user, from the picture template T0, so as to be displayed in the user terminal 20. Upon receipt of the distribution request from the user, the distribution request receiving unit 110 analyzes the content of the distribution request, and, as appropriate, sends an instruction to a key frame distributing unit 120, interpolation data distributing unit 130, viewer distributing unit 140, audio data distributing unit 150 and a charge unit 160.

When the user utilizes the animation distributing server 30 for the first time, a user registration screen (not shown) will first be presented to the user, so as to let the user input his/her individual information. Then, the thus input user information is stored in the user database T3.

Figure 5:
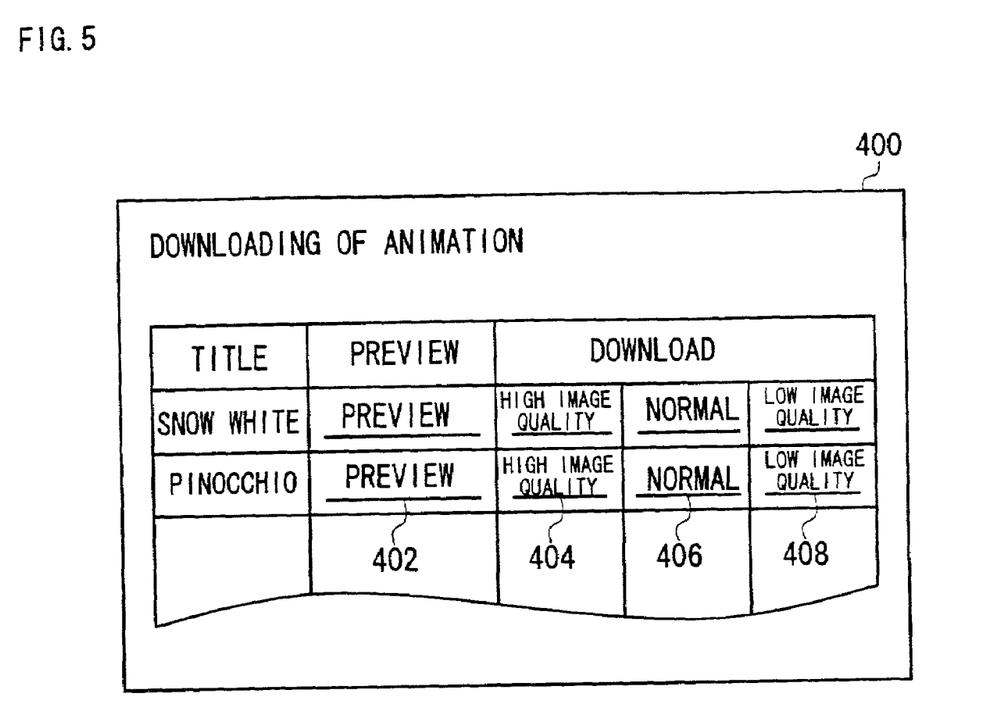
FIG. 5 shows an example of an animation distribution screen.

FIG. 5 shows an example animation distribution screen 400 which may be displayed on the user terminal 20 by the distribution request receiving unit 110. On the animation distribution screen 400, titles of animations stored in the animation distributing server 30 are displayed. The user selects an animation that he/she desires to see among the displayed titles.

Then, the user may see a preview of the animation by clicking on a preview button 402, so that the preview can help him/her select what he/she desires. When the user clicks on the preview button 402, the animation distributing server 30 reproduces the animation for a predetermined duration of time. In this case, a predetermined number of key frames as well as interpolation data thereof may be transmitted, or motion picture data in other formats may be transmitted. Or, some numbers of key frames only may be transmitted.

When the user wishes to download the animation, he/she clicks on a download button 404, 406 or 408, depending on the desired image quality of the animation, so that a distribution request is sent to the animation distributing server 30. When a high image quality button 404 is clicked by the user, the animation distributing server 30 distributes fine and high-image-quality animation by increasing the number of key frames. When a low image quality button 408 is clicked by the user, the animation distributing server 30 distributes animation having a smaller amount of data, by keeping the number of key frames low.

When the key frame distributing unit 120 receives an animation distribution request from the user, the unit 120 reads out key frames of the animation from the key frame storage T1. First, a key frame selector 122 selects key frames to be sent, from the key frames thus read out according to the user's request. Then, if necessary, an encryption unit 170 encrypts the selected key frames according. Thus, a third party other than the user may be prevented from receiving and utilizing the key frames. Thereafter, the key frame distributing unit 120 sends the key frames to the user terminal 20 via the communication unit 102. Information necessary for decoding the encrypted key frames may also, for example, be sent to the user in a form such that the information is embedded in the viewer.

When the user requires a high-image-quality animation, the key frame selector 122 may select all key frames it stores. When the user requires a low-image-quality animation, the key frame selector 122 may thin out the key frames at predetermined intervals. Thus, the key frame selector 122 may select key frames based on a condition relating to the image quality. Moreover, the key frame selector 122 may select only the key frames for scenes that the user desires. The key frames may be selected so that the combination thereof differs for each user. Thus, as mentioned above, by recording the key frames transmitted to the users in the user database T3 helps to identify a user who made an unauthorized duplicate in the event that illegal copies of the animation circulate widely.

An interpolation data distributing unit 130 generates interpolation data which interpolates between the key frames selected by the key frame selector 122, and distributes the interpolation data thus generated to the user. Firstly, an interpolation data generator 132 carries out a matching processing between key frames in both directions, so as to generate the interpolation data. Then, the technique disclosed in Japanese Patent No. 2927350 (described herein) may be utilized. Thereafter, the encryption unit 170 may encrypt the interpolation data while the digital watermarking processing unit 180 may also insert data, such as a user name read out of the user database T3, into the interpolation data as a digital watermark. Inserting the user data as a digital watermark further helps to prevent illegal duplicates from circulating. Thereafter, the interpolation data distributing unit 130 transmits the interpolation data to the user terminal 20 via the communication unit 102.

A viewer distributing unit 140 distributes to the user a viewer by which to reproduce animation from the key frames and the interpolation data. The viewer may be one utilizing the technique disclosed in the Japanese Patent No. 2927350. If necessary, the viewer too may be encrypted by the encryption unit 170 and a digital water marking may be inserted into the viewer by the digital watermarking processing unit 180.

The audio data distributing unit 150 transmits the audio data accompanying the animation to the user by reading out the audio data from the audio data storage T2. Again, if necessary, the encryption processing and digital watermarking processing may be performed on the audio data as well.

A charge unit 160 carries out a process of charging the user for the commercial value of the animation. In this first embodiment, when a request to distribute animation is received from a user, the charge unit 160 adds the value of the animation to the charge amount column 204 of the user database T3. An account settlement processing may be performed on-line or off-line, every time the animation is distributed or at intervals of a predetermined period to settle the charge together for the period covered.

As shown in FIG. 2, when the animation distributing server 30 according to the present embodiment receives a distribution request for animation from a user, the server 30 transmits the key frames constituting the animation and the interpolation data that interpolates between the key frames, in separate states. In other words, the key frames and the interpolation data are transmitted to the same user at different times, respectively. Thus, even if one of the key frames or the interpolation data is stolen and used by a third party, possible misuse and illegal use of the stolen animation can be prevented, since the animation can not be reproduced without the other separated part.

The key frames, interpolation data and audio data are preferably transmitted in a state such that they can be integrated at the user side. For example, names of the respective files may be "0001.key", "0001.map" and "0001.wav" in which the same identification numbers are used. Methods by which to recombine and integrate the separated parts are not limited to this and any methods capable of integrating the separated parts of the animation at the user's viewer will suffice.

Though the key frames, interpolation data and viewer are transmitted in this order in FIG. 2, the order in which they are sent is not limited to this. The timing of the charge processing may also vary. Moreover, it may be preferable if a plurality of animations having different titles can be reproduced by a commonly used viewer, in which case the viewer does not need to be resent to the user each time.

As described above, according to the animation distributing system according to this first embodiment, the animation is distributed using a smaller amount of data compared to conventional motion picture distributing methods. Moreover, since a plurality of data necessary for reproducing the animation are separately transmitted in separated states, a reliable animation distributing method with improved protection against unauthorized copying is provided.

EMBODIMENT 2

Figure 6:
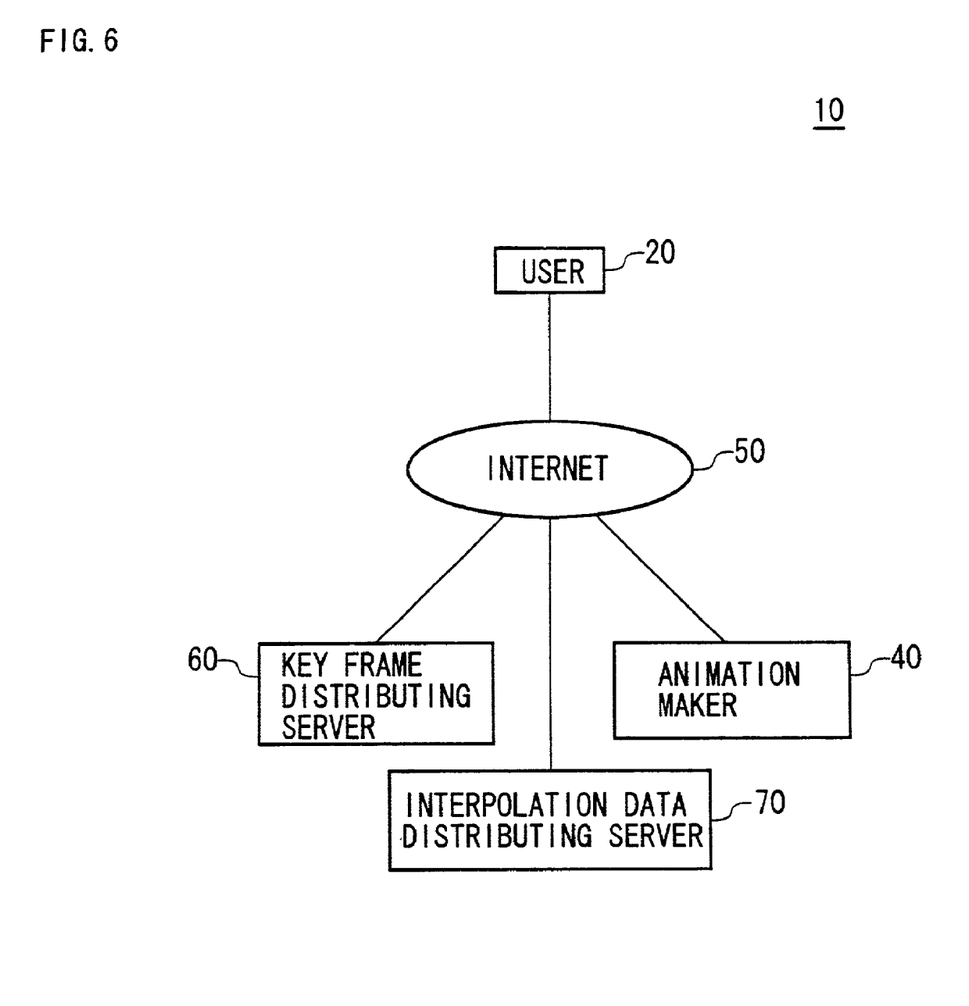
FIG. 6 shows a structure of an animation distributing system according to a second embodiment of the present invention.

FIG. 6 shows a structure of an animation distributing system 10 according to a second embodiment. The animation distributing system 10 according to the second embodiment includes a key frame distributing server 60 and an interpolation data distributing server 70 in the place of the animation distributing server 30 in the animation distributing system 10 shown in FIG. 1. A user terminal 20, the key frame distributing server 60, the interpolation distributing server 70 and an animation distributor or animation maker 40 are all connected to a network such as the Internet 50 in this example of FIG. 6.

Figure 7:
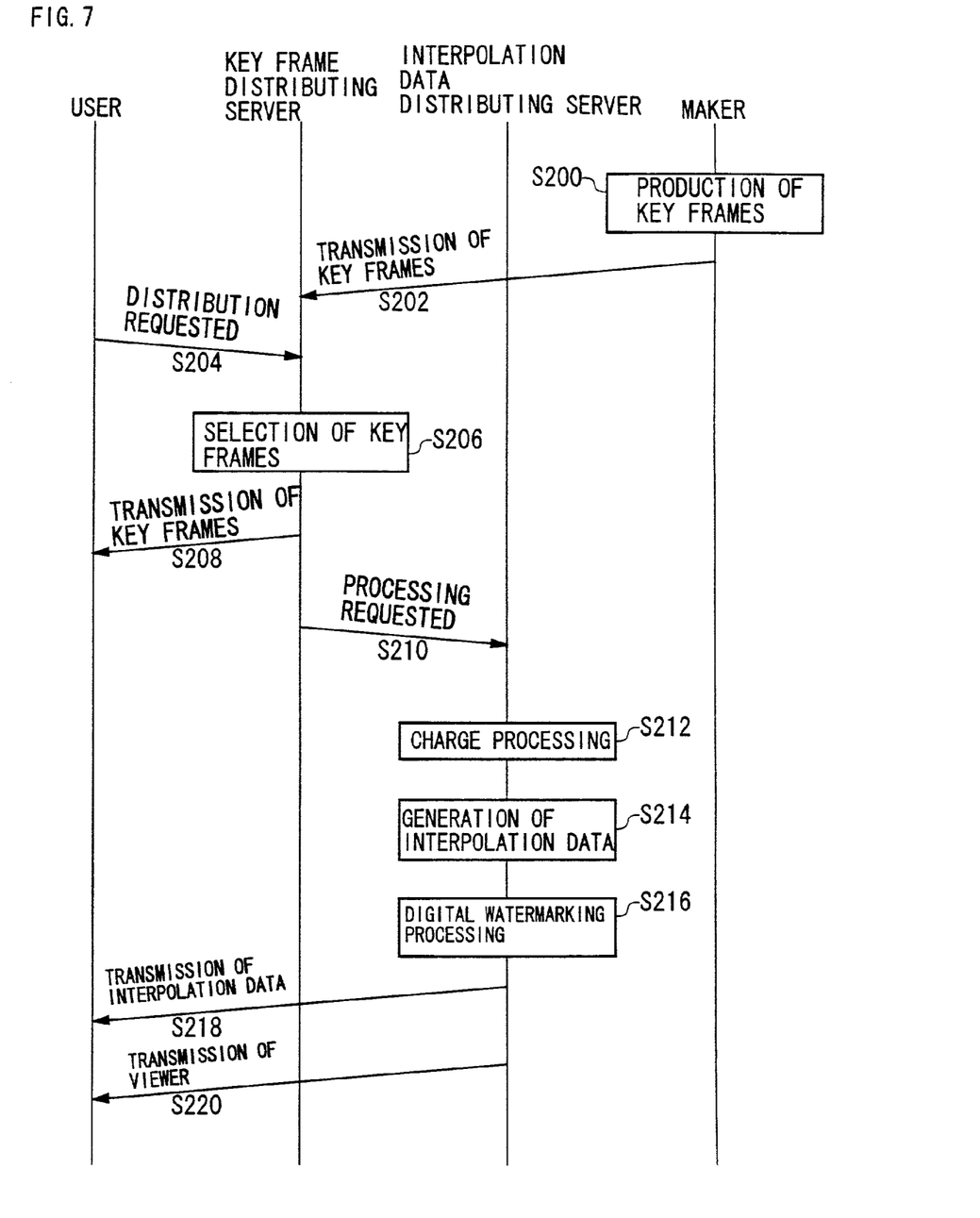
FIG. 7 shows a schematic procedure for a process of animation distribution in the animation distributing system according to the second embodiment.

FIG. 7 describes a processing flow in the animation system 10 when animation is distributed from the animation distributing server 30 to the user 20, in terms of communication between the user 20, key frame distributing server 30, interpolation data distributing server 70 and the animation maker 40.

Referring to FIG. 7, firstly the animation maker 40 produces key frames (S100) which will be transmitted to the key frame distributing server 60 (S202). When the key frame distributing server 60 receives a request for animation distribution from the user (S204), the key frame distributing server 60 selects the key frames to be distributed, based on a user's instruction (S206) and transmits the thus selected key frames to the user (S208). Thereafter, the key frame distributing server 60 makes a request for the interpolation data distributing server 70 to carry out a distribution processing of interpolation data (S210). The interpolation data distributing server 70 carries out a charge processing (S212), generates the interpolation data (S214), carries out a process of inserting digital watermarks (S216), and transmits the interpolation data to the user (S218). Moreover, a viewer which reproduces the animation from the key frames and the interpolation data is also sent to the user (S220).

Figure 8:
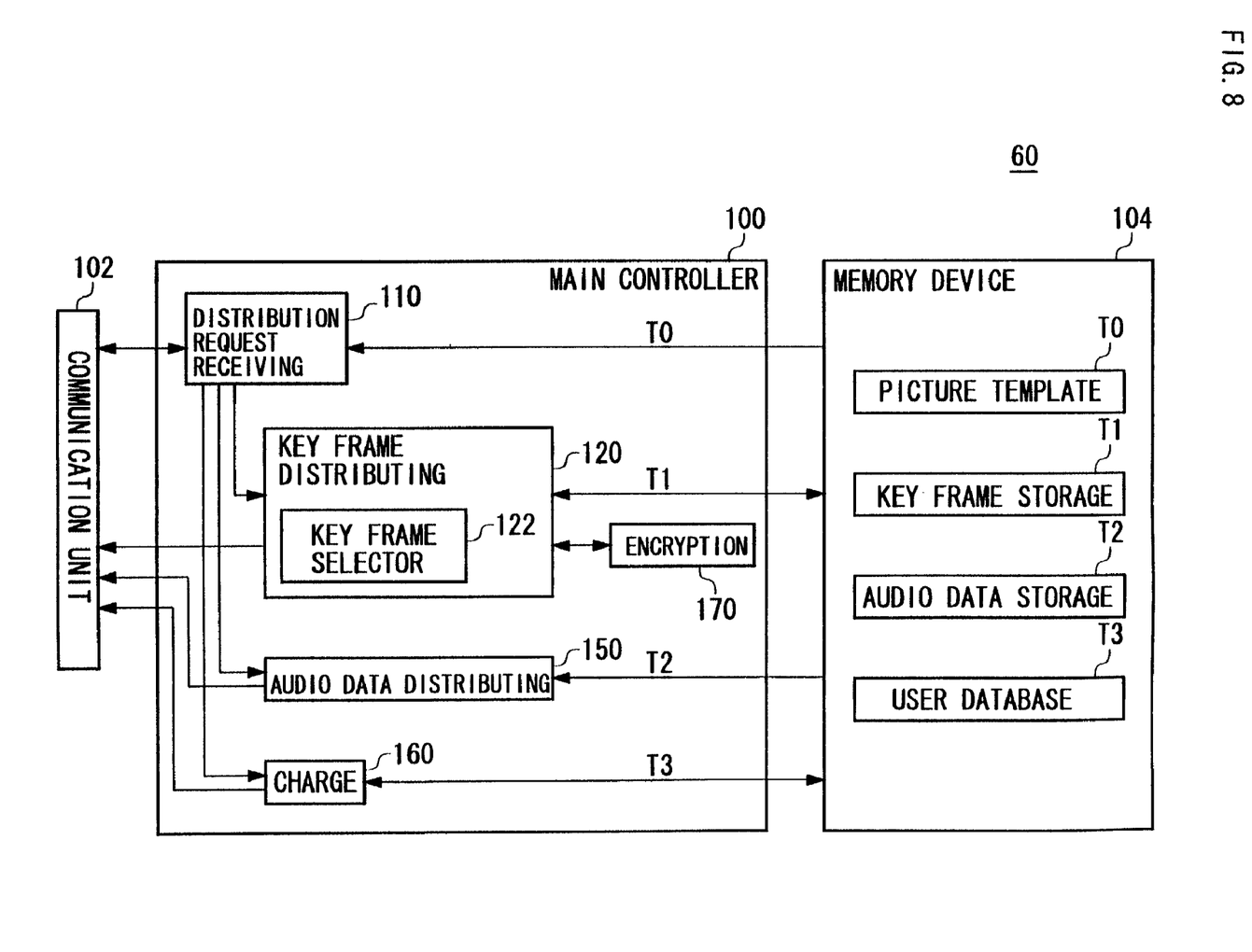
FIG. 8 shows an internal structure of a key frame distributing server.

FIG. 8 shows an internal structure of the key frame distributing server 60. The key frame distributing server 60 includes, among the elements of the animation distributing server 30 shown in FIG. 3, elements necessary for distributing the key frames. The same elements as those shown in FIG. 3 are given the same reference numerals.

In the second embodiment, when a distribution request receiving unit 110 receives a distribution request of animation from the user, the distribution request receiving unit 110 instructs the key frame distributing unit 120, audio data distributing unit 150 and charge unit 160 to carry out necessary processings. At the same time, the distribution request receiving unit 110 makes a request to the interpolation data distributing server 70 that the interpolation data be distribution-processed. Then, the key frames selected by a key frame selector 122 are transmitted to the interpolation data distributing server 70. Other operations are similar to those described in the first embodiment.

Figure 9:
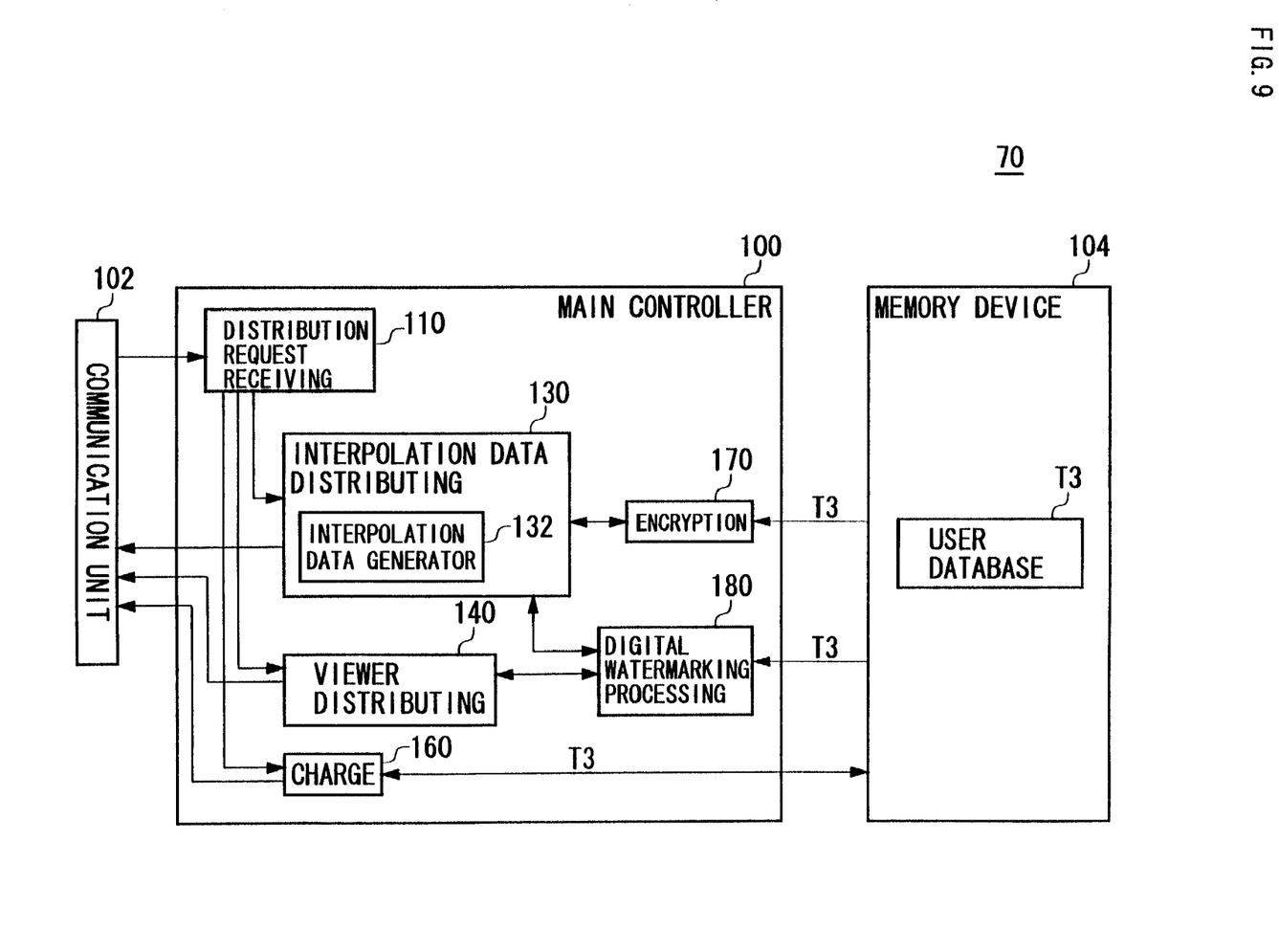
FIG. 9 shows an internal structure of an interpolation data distributing server.

FIG. 9 shows an internal structure of the interpolation data distributing server 70. The interpolation data distributing server 70 includes, among the elements of the animation distributing server 30 shown in FIG. 3, elements necessary for distributing the interpolation data. The same elements as those shown in FIG. 3 are given the same reference numerals.

In the second embodiment, an interpolation data generator 132 generates interpolation data based on the key frames supplied from the key frame distributing server 60. Other operations are similar to those described in the first embodiment.

As described above, the key frames and the interpolation data are sent from separate servers, respectively, namely, in a broader sense the key frames and the interpolation data are sent through different routes, respectively, so that the risk where both the key frames and interpolation data might be intercepted or stolen and used by third parties is minimized. Similar to the case of the first embodiment, the key frames and the interpolation data are transmitted in a form such that they can be recombined and integrated at the user side.

Though the key frames, interpolation data and viewer are transmitted in this order in FIG. 7, the order in which they are sent is not limited to this, similar to the first embodiment. The timing of the charge processing is not limited to that shown in FIG. 7, and the key frame distributing server 60 may also carry out a processing which charges values of the key frames. The user database T3 needs not be provided in both the key frame distributing server 60 and the interpolation data distributing server 70. The user database T3 may be generally managed by only one of the two servers.

The animation maker 40 may send the key frames to not only the key frame distributing server 60 but also to the interpolation data distributing server 70. Then, when the key frame distributing server 60 requests the interpolation data distributing server 70 to generate the interpolation data, the key frame distributing server 60 needs not to send the key frames themselves but needs only to inform the interpolation data distributing server 70 of which key frames were sent. Thus, the transmission load can be reduced.

The animation maker 40 itself may operate the key frame distributing server 60. In this case, the step 202 in which the key frames are transmitted to the key frame distributing server 60 may be omitted.

EMBODIMENT 3

Figure 10:
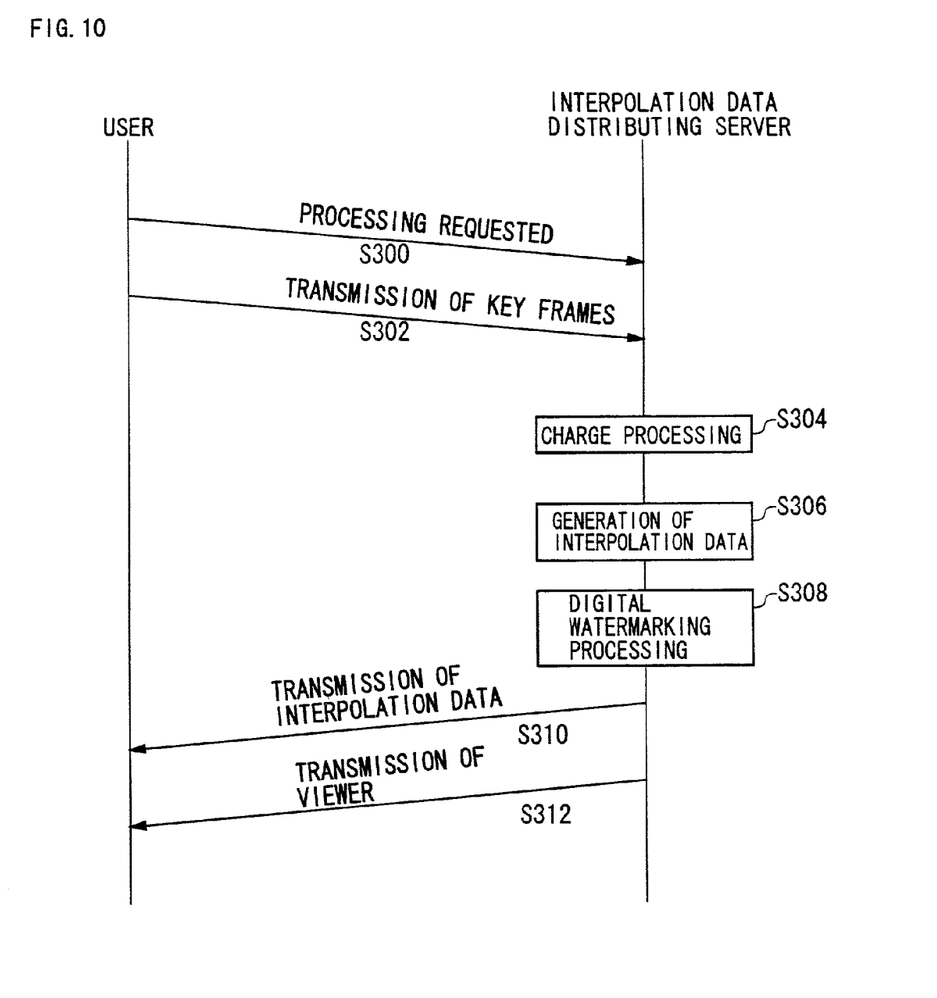
FIG. 10 shows a schematic procedure for a process of animation distribution in an animation distribution system according to a third embodiment of the present invention.

FIG. 10 describes a processing flow in the animation distributing system 10 according to a third embodiment when animation is distributed to the user 20, in terms of exchange between the user 20 and the interpolation data distributing server 70. The structure of the interpolation data distributing server 70 in the third embodiment is similar to that of the second embodiment shown in FIG. 9.

Referring to FIG. 10, firstly the user requests the interpolation data distributing server 70 to perform a distribution processing of interpolation data (S300), and then the user sends key frames desiring generation of interpolation data to the interpolation data distributing server 70 (S302). The interpolation data distributing server 70 carries out a charge processing (S304), generates the interpolation data (S306), then carries out a digital watermarking processing by inserting digital watermarks into the interpolation data (S308) and transmits the interpolation data to the user (S310). Moreover, the interpolation data distribution server 70 sends a viewer to the user (S312), if necessary.

The interpolation data distributing server 70 according to the third embodiment can be utilized, for example, when a user, who has obtained only key frames from a source, as as the animation maker 40 or the key frame distributing server 60, wishes to obtain interpolation data in order to produce animation. Moreover, the server 70 according to the present embodiment can be utilized when, after having produced or obtained key frames only, a maker wishing to distribute animation intends to obtain interpolation data thereof.

The present invention has been described based on several embodiments which are only exemplary. It will be understood by those skilled in the art that there are further available various modifications to each element and component and the combination of each process described and that such modifications are also encompassed by the scope of the present invention.

According to the present embodiments, an animation distributing method, server, and system which uses a reduced amount of data is provided. Moreover, by implementing the present invention, more reliable animation distribution can be performed by protecting against unauthorized duplication.

Although the present invention has been described by way of exemplary embodiments, it should be understood that many changes and substitutions may be made by those skilled in the art without departing from the spirit and the scope of the present invention which is defined by the appended claims.

What is claimed is:

1. An animation distributing server, comprising:
   a key frame acquiring unit configured to acquire key frames from among a plurality of frames that constitute an animation;
   an interpolation data generator configured to generate interpolation data used for composing an animation by interpolating between the key frames; and
   an interpolation data distributing unit configured to distribute the interpolation data to a user in a separate data stream from the key frames.

2. An animation distributing server according to claim 1, wherein said interpolation data generator is configured to generate the interpolation data by performing a matching processing between the key frames.

3. An animation distributing server according to claim 1, further comprising a key frame distributing unit configured to distribute the key frames to the user in a state such that the key frames are capable of being integrated with the separately transmitted interpolation data at a user side.

4. An animation distributing server according to claim 2, further comprising a key frame distributing unit configured to distribute the key frames to the user in a state such that the key frames are capable of being integrated with the separately transmitted interpolation data at a user side.

5. An animation distributing server according to claim 3, further comprising a key frame selector configured to select key frames to be sent to the user, from the key frames,
   wherein said interpolation data generator generates interpolation data by interpolating between the selected key frames.

6. An animation distributing server according to claim 5, wherein said key frame selector selects key frames in such a manner that a combination of key frames selected differs for each user.

7. An animation distributing server according to claim 5, wherein said key frame selector selects key frames based on a condition relating to image quality of the animation.

8. An animation distributing server according to claim 1, further comprising a viewer distributing unit configured to distribute a viewer that composes an animation by the key frames and the interpolation data so as to be displayed.

9. An animation distributing server according to claim 2, further comprising a viewer distributing unit configured to distribute a viewer that composes an animation by the key frames and the interpolation data so as to be displayed.

10. An animation distributing server according to claim 3, further comprising a viewer distributing unit configured to distribute a viewer that composes an animation by the key frames and the interpolation data so as to be displayed.

11. An animation distributing server according to claim 5, further comprising a viewer distributing unit configured to distribute a viewer that composes an animation by the key frames and the interpolation data so as to be displayed.

12. An animation distributing server according to claim 8, further comprising a digital watermarking processing unit configured to insert digital watermarking data into the interpolation data or viewer.

13. An animation distributing server according to claim 12, further comprising a storage including a user database which records information on individual users.

14. An animation distributing server according to claim 11, wherein the animation may include audio data, further comprising an encryption unit configured to encrypt the selected key frames or audio data, wherein information necessary for decoding the encrypted key frames or audio data is transmitted to the user in a form such that the information is embedded in the viewer.

15. An animation distributing method, comprising:
acquiring key frames from among a plurality of frames that constitute animation;
acquiring interpolation data used for composing animation by interpolating the key frames; and
distributing the key frames and the interpolation data via different routes to a user.

16. An animation distributing method, comprising:
acquiring key frames from among a plurality of frames that constitute animation;
acquiring interpolation data used for composing animation by interpolating the key frames; and
distributing the key frames and the interpolation data at different timings to a user.

17. An animation distributing server comprising:
a key frame acquiring unit configured to acquire key frames from among a plurality of frames that constitute an animation;
an interpolation data generator configured to generate interpolation data used for composing an animation by interpolating between the key frames; and
an interpolation data distributing unit configured to distribute the interpolation data to a user such that the interpolation data are distributed in a separate state and at a separate time from the distribution of the key frames.

* * * * *